(12) United States Patent
Li et al.

(10) Patent No.: US 11,825,844 B2
(45) Date of Patent: Nov. 28, 2023

(54) **METHOD FOR CONTROLLING *FUSARIUM OXYSPORUM* F. SP. *CUBENSE* TROPICAL RACE 4**

(71) Applicant: GUANGXI UNIVERSITY, Nanning (CN)

(72) Inventors: Jianxiong Li, Guangzhou (CN); Zhihong Tian, Guangzhou (CN); Zhiyan Zhu, Guangzhou (CN)

(73) Assignee: GUANGXI UNIVERSITY, Nanning (CN)

( * ) Notice: Subject to any disclaimer, the term of this patent is extended or adjusted under 35 U.S.C. 154(b) by 0 days.

(21) Appl. No.: 17/804,897

(22) Filed: Jun. 1, 2022

(65) Prior Publication Data

US 2023/0057048 A1 Feb. 23, 2023

(30) Foreign Application Priority Data

Aug. 17, 2021 (CN) .......................... 202110942286.5

(51) Int. Cl.
*A01N 43/16* (2006.01)
*A01P 3/00* (2006.01)
*A01N 25/04* (2006.01)

(52) U.S. Cl.
CPC ............. *A01N 43/16* (2013.01); *A01N 25/04* (2013.01); *A01P 3/00* (2021.08)

(58) Field of Classification Search
CPC ...................................... A01N 43/16
See application file for complete search history.

*Primary Examiner* — Paul V Ward
(74) *Attorney, Agent, or Firm* — M&B IP Analysts, LLC

(57) ABSTRACT

The present disclosure provides a method for controlling *Fusarium oxysporum* f. sp. *cubense* tropical race 4 (Foc TR4). The present disclosure mainly aims to solve the problem of effectively inhibiting the Foc TR4, but the existing fungicides cannot effectively inhibit the Foc TR4 without damage to banana plants. By treating with the fungicide disclosed by the present disclosure, the growth of the Foc TR4 can be limited, and there is no adverse effect on banana plants.

5 Claims, 3 Drawing Sheets

METHOD FOR CONTROLLING *FUSARIUM OXYSPORUM* F. SP. *CUBENSE* TROPICAL RACE 4

CROSS REFERENCE TO RELATED APPLICATION

This patent application claims the benefit and priority of Chinese Patent Application No. 202110942286.5, filed on Aug. 17, 2021, the disclosure of which is incorporated by reference herein in its entirety as part of the present application.

TECHNICAL FIELD

The present disclosure belongs to the field of control of pests and diseases of banana, and specifically relates to a method for controlling *Fusarium oxysporum* f. sp. *cubense* tropical race 4 (Foc TR4).

BACKGROUND ART

*Fusarium oxysporum* f sp. *cubense* (Foc) is the causal agent of banana wilt. Among them, race 1 (Foc 1) and race 4 (Foc 4) are the predominant agents threatening global banana production (Siddhesh, International Journal of Pest Management, 2015, 61(3): 250-263). Their soil-borne properties make it very difficult to control or even eliminate the Foc (Carvalhais, Frontier in plant science, 2019, 10). As the disease progresses, the leaves of the plant begin to turn yellow and gradually wither. As the disease spreads further, the leaves will fall, forming a circle around the pseudostem. New leaves will have edge wrinkles (Berg, Molecular Plant Pathology, 2010, 8(3)). Once a banana plant is infected by the Foc, there are no effective control measures at present. This difficulty is due to the fact that the Foc can produce a large number of spores, which can survive in the soil for as long as 30 years (Ploetz, Plant Health Prog, 2000, 10:1-7). The existing fungicides and fumigation methods cannot effectively control the spread of spores of the Foc (Ploetz, Plant Health Progress, 2005).

At present, most fungicides have a relatively common problem, that is, there is a contradictory relationship between their inhibitory concentrations and the restriction on plant growth. Usually, they have a certain negative impact on plant growth while inhibiting the growth of pathogenic fungi. It is necessary to find a balance between the inhibition of the growth of pathogenic fungi and the plant growth. Fungicides that have an effective effect on pathogenic fungi should be further screened out.

Salendra et al. isolated the natural compound xerucitrinin A from *Penicillium citrinum* SCSIO 41017 for the first time (Salendra, Natural Product Research, 2019). In 2020, our research group isolated the compound xerucitrinin A from *Streptomyces* Sm4-1986 for the first time (Wu, Natural Product Research, 2020). The structural formula is as follows:

SUMMARY

The present disclosure mainly aims to solve the problem of effectively inhibiting Foc TR4, but the existing fungicides cannot effectively inhibit the Foc TR4 without damage to banana plants. By treating with the fungicide disclosed by the present disclosure, the growth of the Foc TR4 can be limited, and there is no adverse effect on banana plants. Therefore, a first objective of the present disclosure is to provide a method for controlling Foc TR4.

Preferably, the agrochemical agent for controlling Foc TR4 may further include an agricultural-pharmacologically acceptable adjuvant.

Preferably, the agrochemical agent for controlling Foc TR4 may further include other agrochemical agents for controlling Foc TR4.

Preferably, the agrochemical agent for controlling Foc TR4 may be in a pharmaceutical dosage form selected from the group consisting of a wettable powder, a water dispersible granule, a suspension and an emulsifiable concentrate.

Preferably, a concentration of the compound xerucitrinin A in the agrochemical agent for controlling Foc TR4 may be 3 mM.

Compared with the prior art, the present disclosure has the following effects:

1. The compound xerucitrinin A has an inhibitory effect on the growth of the Foc TR4.

2. The compound xerucitrinin A has no adverse effect on banana plants at a concentration that completely inhibits the growth of the Foc TR4.

Therefore, the compound xerucitrinin A can be used to prepare the agrochemical agent for controlling Foc TR4.

DETAILED DESCRIPTION OF THE EMBODIMENTS

In order to specifically clarify the means and implementation effects used in the present disclosure, the present disclosure will be further described below in conjunction with examples and drawings.

Example 1

Chrome azurol S (CAS) agar plate, namely the siderophore screening medium consisting of 1 mL of 20% glucose solution, 3 mL of 10% casein, 100 μL of 1 mmoL/L $CaCl_2$), 2 mL of 1 mmoL/L $MgSO_4$, 100 mL of $H_2O$, and 1.8 g of agar, was heated, and supplemented with 5 mL each of CAS dye solution and phosphate buffered saline (PBS) at 60° C. slowly to obtain a CAS-blue agar medium.

CAS dye solution included: 1 mmol/L CAS, 4 mmol/L hexadecyl trimethyl ammonium bromide, and 0.1 mmol/L $FeCl_3$.

PBS (pH 6.8) included: 2.427 g of $Na_2HPO_4.12H_2O$, 0.5905 g of $NaH_2PO_4.2H_2O$, 0.075 g of $KH_2PO_4$, 0.250 g of $NH_4Cl$, 0.125 g of NaCl, and 100 mL of $H_2O$. All the above solutions were prepared with deionized water.

A sterile Oxford cup was placed in the middle of the CAS agar plate; 200 μL of 0.2 mM compound solution was pipetted into the Oxford cup using a sterile pipette tip, and let stand for 12 h to observe whether there was a siderophore zone around the Oxford cup.

Figure 1:
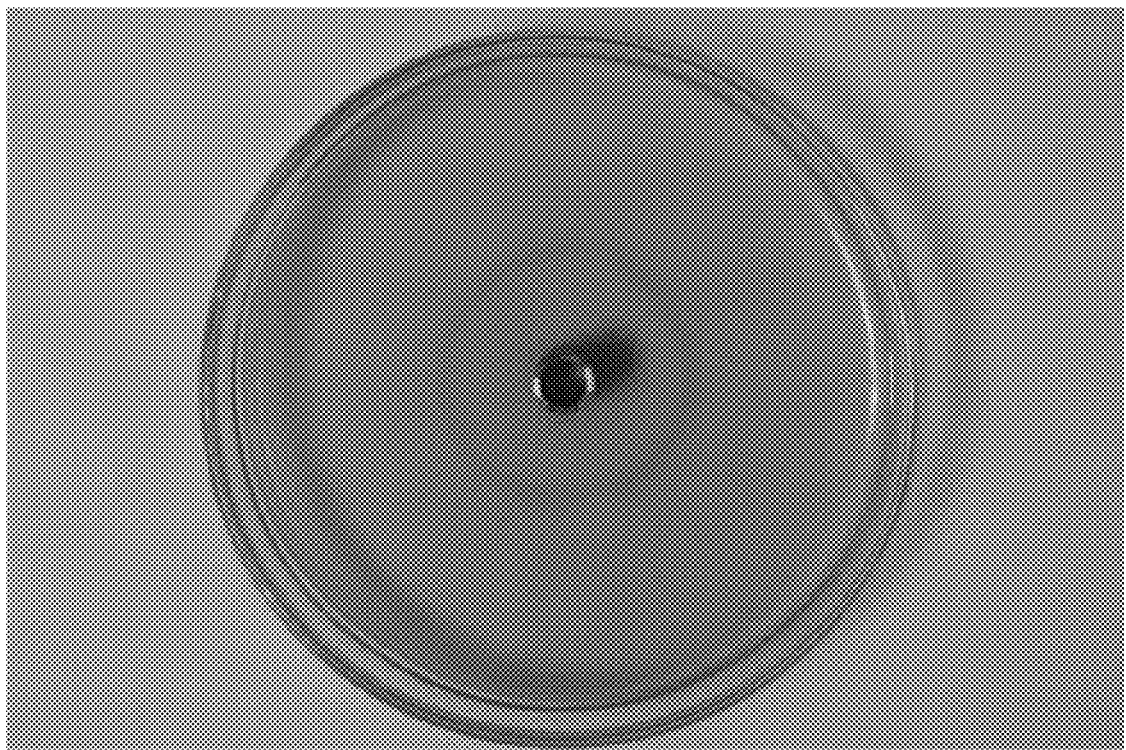
FIG. 1 illustrates a Fe-binding function of compound xerucitrinin A.

The results show that the compound xerucitrinin A has a Fe-binding function. The Fe-binding ability of xerucitrinin A was detected by using the CAS agar plate. As shown in FIG. 1, xerucitrinin A was added to an Oxford cup and let stand for 3 h, and a siderophore zone appeared around the Oxford cup, indicating that xerucitrinin A has a Fe-binding ability. The growth of Foc TR4 is inhibited by binding Fe.

Example 2

XcA (the compound xerucitrinin A) at a final concentration of 3 mM was added to Gauze's Medium #1, and the filtered spore suspension of Foc was added, with a final spore concentration of $1 \times 10^7$ spores/mL. The control treatment was implemented by treating with the same volume of sterile water. The spore suspension was cultured at 28° C. in the dark for 24 h. The spores of Foc were collected and fixed in a 2.5% (v/v) glutaraldehyde solution at 4° C. overnight. The fixed spores were rinsed twice with 0.1 mol/L PBS (pH 7.4), dehydrated gradiently with 30%, 50%, 70%, 80%, 90%, 95%, and 100% ethanol solutions for 20 min, dried and subjected to gold spraying. The spore morphology of Foc TR4 was observed under a scanning electron microscope.

Figure 2:
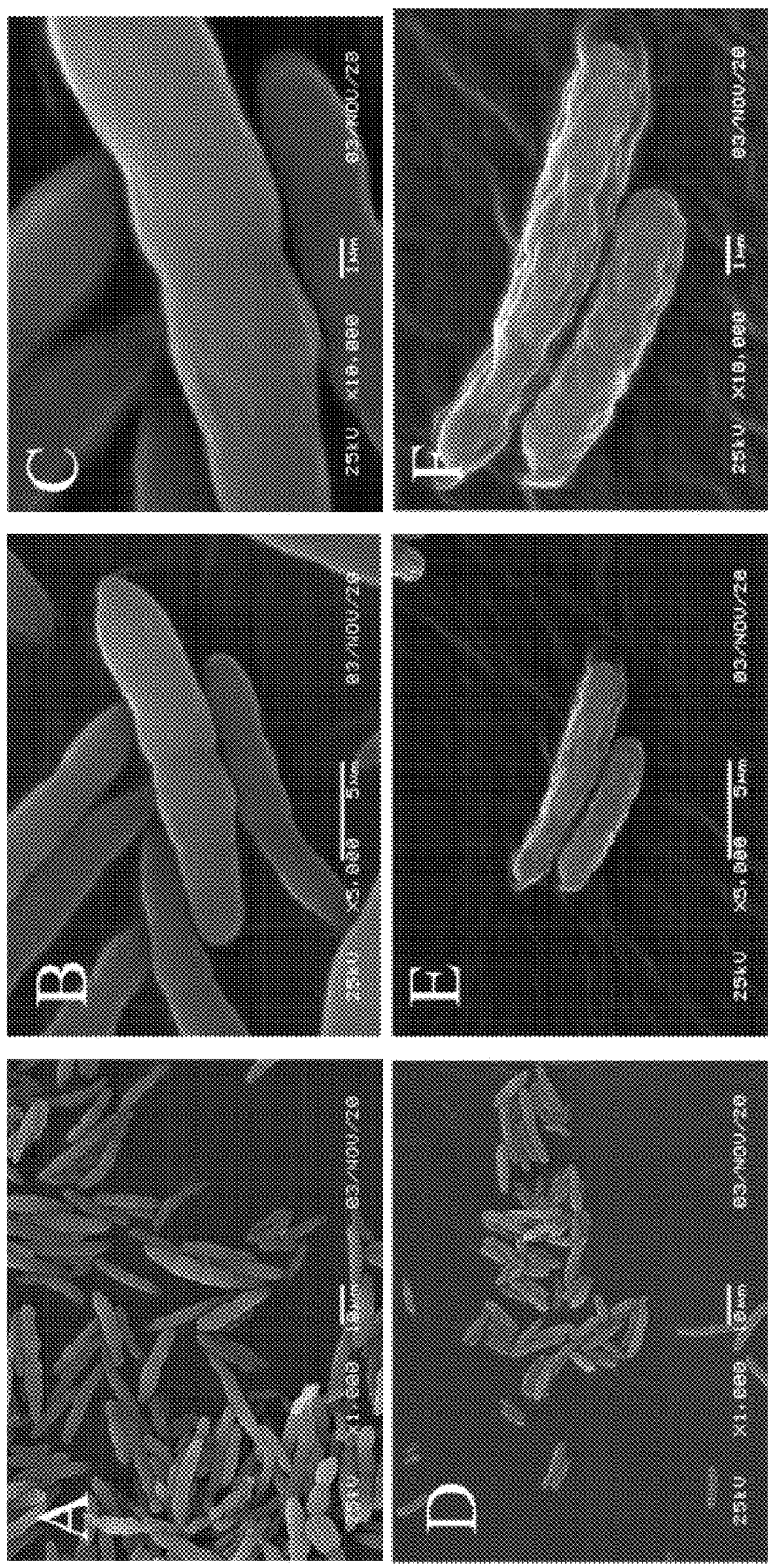
FIG. 2 illustrates an effect of compound xerucitrinin A on spores of Foc TR4. (A to C) Normal spores of Foc TR4; (D to F) spores of Foc TR4 treated with 3 mM compound xerucitrinin A.

The results show that the addition of 3 mM xerucitrinin A in the Gauze's Medium #1 can change the spore morphology of Foc, cause obvious crenation on the surface of the spores of Foc, and affect the germination and growth of the spores of Foc (FIG. 2).

Example 3

XcA was dissolved in ethanol. In order to investigate the effect of XcA on the growth of Brazilian banana, 3 mM XcA was added to Gauze's Medium #1. A volume of ethanol (CK) equal to the compound concentration was added to the control. A negative control was set up, and 200 μM 8-hydroxyquinoline (8HQ) was added to the Gauze's Medium #1. Then Brazilian banana seedlings were planted in a culture plate containing the above-mentioned treated medium. Each treatment had 6 replicates (6 Brazilian banana seedlings). The culture plate containing Brazilian banana seedlings was placed in a growth chamber to grow for 10 days to observe the effect on plant growth. Each treatment continued to grow for two months, during which an equal volume of sterile water was supplemented, and the plant height, root weight and seedling weight of each treatment were determined.

Figure 3:
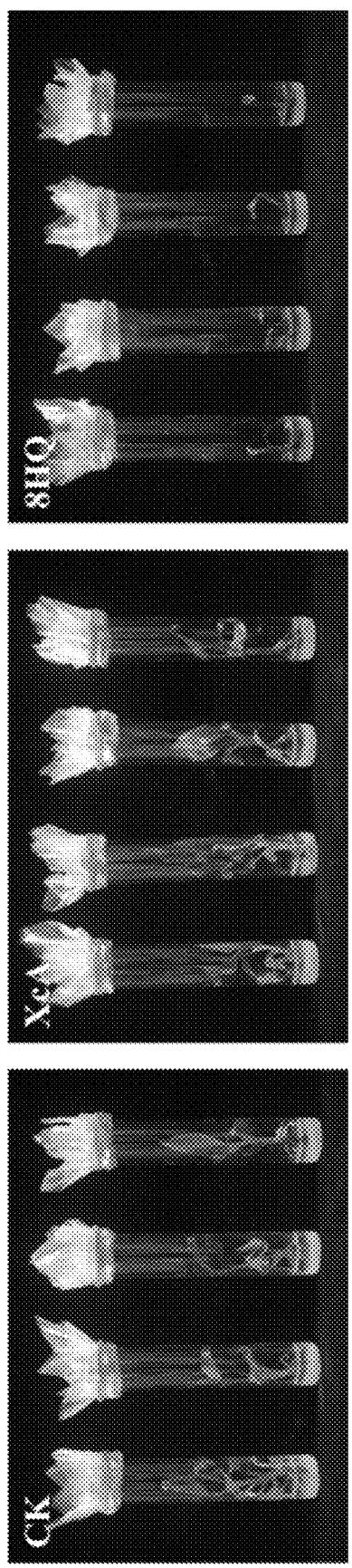
FIG. 3 illustrates effects of compounds xerucitrinin A (XcA) and 8-hydroxyquinoline (8HQ) on the growth of banana seedlings at inhibitory concentrations.

The results showed that sterile water, 3 mM compound xerucitrinin A (XcA) and 200 μM 8HQ were added to the Gauze's Medium #1, respectively. Compared with the control, the 3 mM compound xerucitrinin A had no adverse effect on the growth of banana seedlings (FIG. 3).

The compound xerucitrinin A can be used as an effective additive in a fungicide for controlling Foc TR4, and has excellent application value.

What is claimed is:

1. A method for controlling Fusarium oxysporum f. sp. cubense tropical race 4 (Foc TR4), comprising:
preparing an agrochemical agent, and administering the agrochemical agent to a banana plant in need thereof, wherein the agrochemical agent includes a compound xerucitrinin A.

2. The method according to claim 1, wherein the agrochemical agent for controlling Foc TR4 further comprises an agricultural-pharmacologically acceptable adjuvant.

3. The method according to claim 1, wherein the agrochemical agent for controlling Foc TR4 further comprises other agrochemical agents for controlling Foc TR4.

4. The method according to claim 1, wherein the agrochemical agent for controlling Foc TR4 is in a pharmaceutical dosage form selected from the group consisting of a wettable powder, a water dispersible granule, a suspension and an emulsifiable concentrate.

5. The method according to claim 1, wherein a concentration of the compound xerucitrinin A in the agrochemical agent for controlling Foc TR4 is 3 mM.

* * * * *